(12) United States Patent
Eschborn

(10) Patent No.: US 6,935,097 B2
(45) Date of Patent: Aug. 30, 2005

(54) LOCK ASSEMBLY THAT INHIBITS THRUST REVERSER MOVEMENT AT OR NEAR THE STOWED POSITION

(75) Inventor: David M. Eschborn, Gilbert, AZ (US)

(73) Assignee: Honeywell International, Inc., Morristown, NJ (US)

( * ) Notice: Subject to any disclaimer, the term of this patent is extended or adjusted under 35 U.S.C. 154(b) by 110 days.

(21) Appl. No.: 10/418,643

(22) Filed: Apr. 17, 2003

(65) Prior Publication Data

US 2004/0206066 A1 Oct. 21, 2004

(51) Int. Cl.[7] .................................................. F02K 3/02
(52) U.S. Cl. .............. 60/226.2; 244/110 B; 239/265.19
(58) Field of Search ................. 60/226.2, 230; 244/110 B; 239/265.19–265.41

(56) References Cited

U.S. PATENT DOCUMENTS

| | | | |
|---|---|---|---|
| 1,145,800 A | 7/1915 | Rushton | |
| 1,918,587 A | 7/1933 | Bryant | |
| 3,640,140 A | 2/1972 | Gulick et al. | |
| 3,813,065 A | * 5/1974 | Hallesy et al. | ............... 285/316 |
| 4,181,260 A | * 1/1980 | Nash | ...................... 239/265.39 |
| 4,291,586 A | 9/1981 | Buetemeister | |
| 4,463,657 A | * 8/1984 | Tootle et al. | ................... 91/44 |
| 4,712,441 A | 12/1987 | Abraham | |
| 4,714,006 A | * 12/1987 | Tootle et al. | .................. 92/5 R |
| 4,754,694 A | * 7/1988 | Martin | ......................... 92/5 L |
| 5,031,741 A | * 7/1991 | Otto | ........................... 192/69.3 |
| 5,280,704 A | * 1/1994 | Anderson et al. | .......... 60/226.2 |
| 5,461,935 A | 10/1995 | Hill | |
| 5,609,020 A | * 3/1997 | Jackson et al. | ............ 60/226.2 |
| 5,669,264 A | 9/1997 | Sakura et al. | |
| 5,910,692 A | 6/1999 | Saeda et al. | |
| 5,960,626 A | 10/1999 | Baudu et al. | |
| 6,084,326 A | 7/2000 | Nagai et al. | |
| 6,487,846 B1 | 12/2002 | Chakkera et al. | |
| 6,519,929 B2 | * 2/2003 | Ahrendt | ...................... 60/226.2 |
| 6,687,623 B2 | * 2/2004 | Bailey et al. | .................. 702/42 |

* cited by examiner

*Primary Examiner*—Ted Kim
(74) *Attorney, Agent, or Firm*—Ingrassia Fisher & Lorenz

(57) ABSTRACT

A lock assembly for a thrust reverser system that prevents thrust reverser deployment when the thrust reversers are in the stowed position, but does not prevent thrust reverser movement, in either the deploy or stow directions, when the thrust reversers are out of the stowed position and the lock assembly is in the locked position.

21 Claims, 7 Drawing Sheets

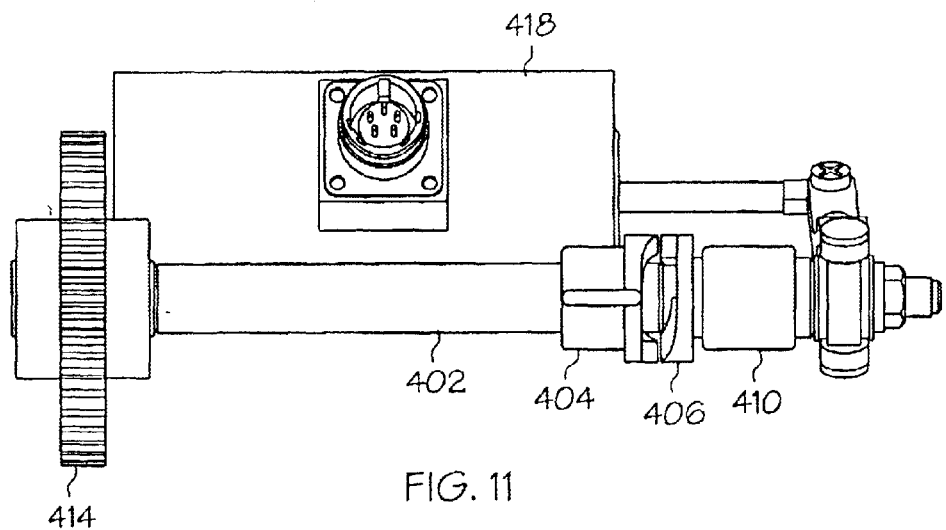
FIG. 11
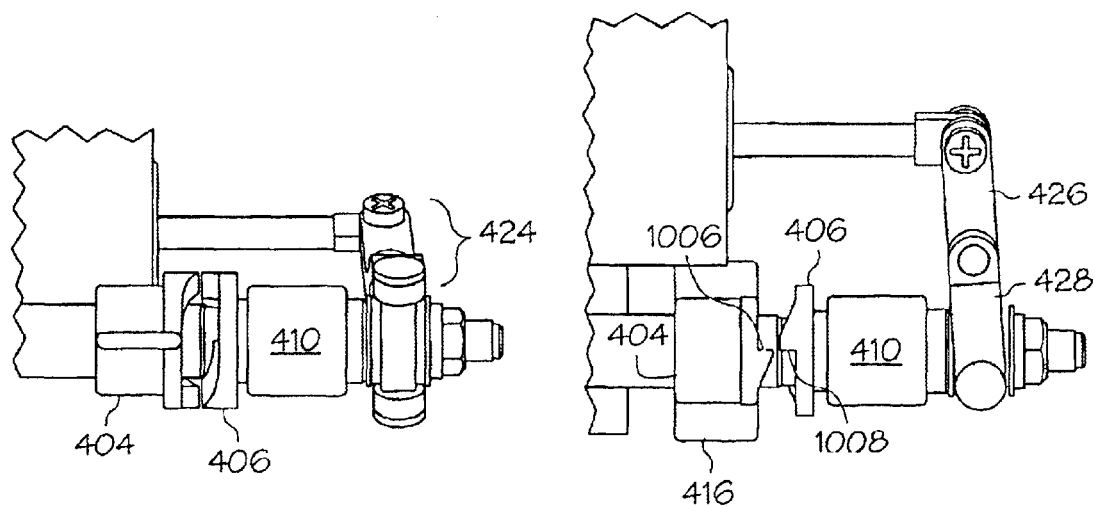
FIG. 12
FIG. 13

LOCK ASSEMBLY THAT INHIBITS THRUST REVERSER MOVEMENT AT OR NEAR THE STOWED POSITION

FIELD OF THE INVENTION

The present invention relates to aircraft engine thrust reverser actuation systems and, more particularly, to a lock that will inhibit thrust reverser movement only when the thrust reversers are in, or near, the stowed position.

BACKGROUND OF THE INVENTION

When a jet-powered aircraft lands, the landing gear brakes and aerodynamic drag (e.g., flaps, spoilers, etc.) of the aircraft may not, in certain situations, be sufficient to slow the aircraft down in the required amount of runway distance. Thus, jet engines on most aircraft include thrust reversers to enhance the braking of the aircraft. When deployed, a thrust reverser redirects the rearward thrust of the jet engine to a generally or partially forward direction to decelerate the aircraft. Because at least some of the jet thrust is directed forward, the jet thrust also slows down the aircraft upon landing.

Various thrust reverser designs are commonly known, and the particular design utilized depends, at least in part, on the engine manufacturer, the engine configuration, and the propulsion technology being used. Thrust reverser designs used most prominently with jet engines fall into three general categories: (1) cascade-type thrust reversers; (2) target-type thrust reversers; and (3) pivot door thrust reversers. Each of these designs employs a different type of moveable thrust reverser component to change the direction of the jet thrust.

Cascade-type thrust reversers are can be used on high-bypass ratio jet engines. This type of thrust reverser is located on the circumference of the engine's midsection and, when deployed, exposes and redirects air flow through a plurality of cascade vanes. The moveable thrust reverser components in the cascade design includes several translating sleeves or cowls ("transcowls") that are deployed to expose the cascade vanes.

Target-type reversers, also referred to as clamshell reversers, are typically used with low-bypass ratio jet engines. Target-type thrust reversers use two doors as the moveable thrust reverser components to block the entire jet thrust coming from the rear of the engine. These doors are mounted on the aft portion of the engine and may form the rear part of the engine nacelle.

Pivot door thrust reversers may utilize four doors on the engine nacelle as the moveable thrust reverser components. In the deployed position, these doors extend outwardly from the nacelle to redirect the jet thrust.

The primary use of thrust reversers is, as noted above, to enhance the braking of the aircraft, thereby shortening the stopping distance during landing.

Hence, thrust reversers are usually deployed during the landing process to slow the aircraft. Thereafter, when the thrust reversers are no longer needed, they are returned to their original, or stowed, position and are locked.

Each of the above-described thrust reverser system designs may include one or more locks to inhibit unintended thrust reverser movement and/or the actuators that move the thrust reversers. Some types of locks are configured such that power is supplied to a lock to disengage it, to allow actuator and/or thrust reverser movement. Conversely, when power is removed from the lock, it is engaged to prevent actuator and/or thrust reverser movement. In some designs, the locks will engage and prevent actuator and/or thrust reverser movement when power is removed, no matter what the position may be of the thrust reverser. In other designs, if power is removed from the lock when the actuator is in either the stowed or deployed position, the locks will engage and prevent actuator or thrust reverser movement. Hence, in either of these designs, if power is inadvertently lost to the lock while the thrust reversers are not in the stowed position, then further movement of the thrust reversers may be prevented. However, despite this drawback, thrust reverser lock systems are safe, reliable, and robustly designed.

Hence, there is a need for a lock assembly for a thrust reverser system that does not prevent thrust reverser movement when the thrust reversers are out of the stowed position and the lock assembly is in the locked position. The present invention addresses this need.

SUMMARY OF THE INVENTION

The present invention relates to a lock assembly and a thrust reverser system with one or more lock assemblies. The lock assembly does not prevent thrust reverser movement when the thrust reversers are out of the stowed position and when the lock assembly is in the locked position.

In one embodiment, and by way of example only, a thrust reverser actuation system includes a power drive unit, a drive mechanism, an actuator assembly, and a lock assembly. The power drive unit is operable to supply a drive force. The drive mechanism is coupled to receive the drive force. The actuator assembly is coupled to the drive mechanism and is operable to move, upon receipt of the drive force, between a stowed position and a deployed position. The lock assembly is coupled to the drive mechanism and includes a lock shaft, a stop collar, and a lock nut. The lock shaft is rotationally mounted lock shaft, has threads on at least a portion of its outer surface, and is rotational in a deploy direction and a stow direction. The stop collar is mounted on the lock shaft and is translationally moveable along at least a section thereof, and has at least a lock nut engagement surface. The lock nut is anti-rotationally mounted on the lock shaft, and has at least a stop collar engagement surface and threads on at least a portion of its inner surface. The stop collar engagement surface is configured to engage the lock nut engagement surface on the stop collar, and the threads on its inner surface mate with the threads on the lock shaft outer surface. Hence, rotation of the lock shaft in the deploy direction and the stow direction causes translation of the lock nut, respectively, between a deploy position and a stow position.

In another exemplary embodiment, a thrust reverser lock assembly includes a lock shaft, a stop collar, and a lock nut. The lock shaft is rotationally mounted lock shaft, has threads on at least a portion of its outer surface, and is rotational in a deploy direction and a stow direction. The stop collar is mounted on the lock shaft and is translationally moveable along at least a section thereof, and has at least a lock nut engagement surface. The lock nut is anti-rotationally mounted on the lock shaft, and has at least a stop collar engagement surface and threads on at least a portion of its inner surface. The stop collar engagement surface is configured to engage the lock nut engagement surface on the stop collar, and the threads on its inner surface mate with the threads on the lock shaft outer surface. Hence, rotation of the lock shaft in the deploy direction and the stow direction causes translation of the lock nut, respectively, between a deploy position and a stow position.

In still another exemplary embodiment, a thrust reverser actuator assembly includes a housing, a drive shaft, and a lock assembly. The drive shaft is rotationally mounted in the housing. The lock assembly includes a lock shaft, a stop collar, and a lock nut. The lock shaft is rotationally mounted in the housing, has threads on at least a portion of its outer surface, and is coupled to the drive shaft to rotate therewith. The stop collar is mounted on the lock shaft and is translationally moveable along at least a section thereof, and has at least a lock nut engagement surface. The lock nut is anti-rotationally mounted on the lock shaft, and has at least a stop collar engagement surface and threads on at least a portion of its inner surface. The stop collar engagement surface is configured to engage the lock nut engagement surface on the stop collar, and the threads on its inner surface mate with the threads on the lock shaft outer surface. Hence, rotation of the lock shaft in the deploy direction and the stow direction causes translation of the lock nut, respectively, between a deploy position and a stow position.

Other independent features and advantages of the preferred actuation system, actuator, and lock assembly will become apparent from the following detailed description, taken in conjunction with the accompanying drawings which illustrate, by way of example, the principles of the invention.

BRIEF DESCRIPTION OF THE DRAWINGS

FIGS. 11, 12, and 13 are a front view, a close-up front view of an end, and a close-up top view of an end, respectively, of the lock assembly of FIG. 4 in an unlocked and stowed configuration.

DETAILED DESCRIPTION OF A PREFERRED EMBODIMENT

Before proceeding with the detailed description, it is to be appreciated that the described embodiment is not limited to use in conjunction with a specific thrust reverser system design. Thus, although the description is explicitly directed toward an embodiment that is implemented in a cascade-type thrust reverser system, in which transcowls are used as the moveable thrust reverser component, it should be appreciated that it can be implemented in other thrust reverser actuation system designs, including those described above and those known now or hereafter in the art.

Figure 1:
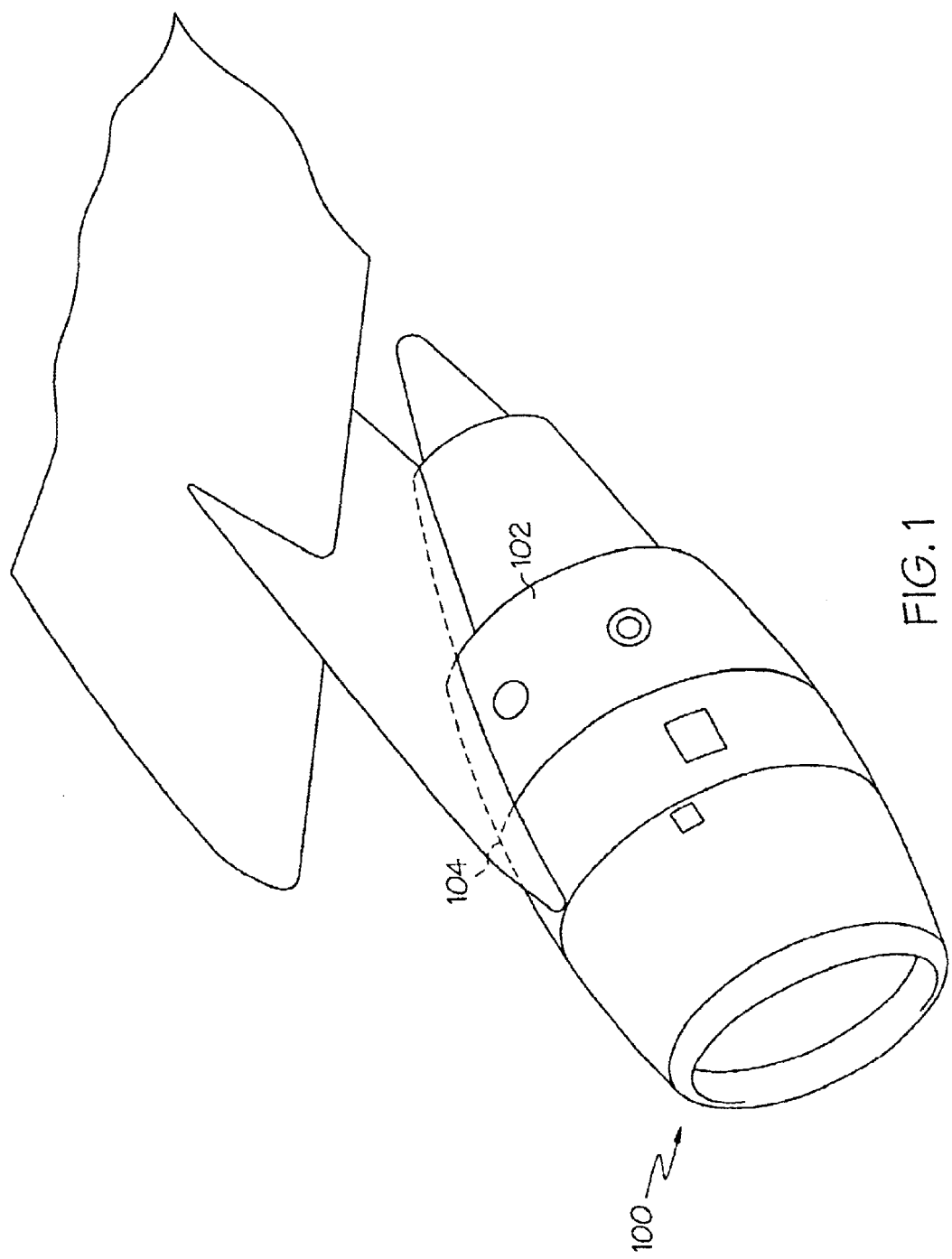
FIG. 1 is a perspective view of portions of an aircraft jet engine fan case.

Turning now to the description, and with reference first to FIG. 1, a perspective view of portions of an aircraft jet engine fan case 100 that incorporates a cascade-type thrust reverser is depicted. The engine fan case 100 includes a pair of semi-circular transcowls 102 and 104 that are positioned circumferentially on the outside of the fan case 100. The transcowls 102 and 104 cover a plurality of non-illustrated cascade vanes. A mechanical link 202 (see FIG. 2), such as a pin or latch, may couple the transcowls 102 and 104 together to maintain the transcowls 102 and 104 in correct alignment on non-illustrated guides on which the transcowls 102 and 104 translate. When the thrust reversers are commanded to deploy, the transcowls 102 and 104 are translated aft. This, among other things, exposes the cascade vanes, and causes at least a portion of the air flowing through the engine fan case 100 to be redirected in a forward direction. This re-direction of air flow in a forward direction creates a reverse thrust and, thus, works to slow the airplane upon landing.

Figure 2:
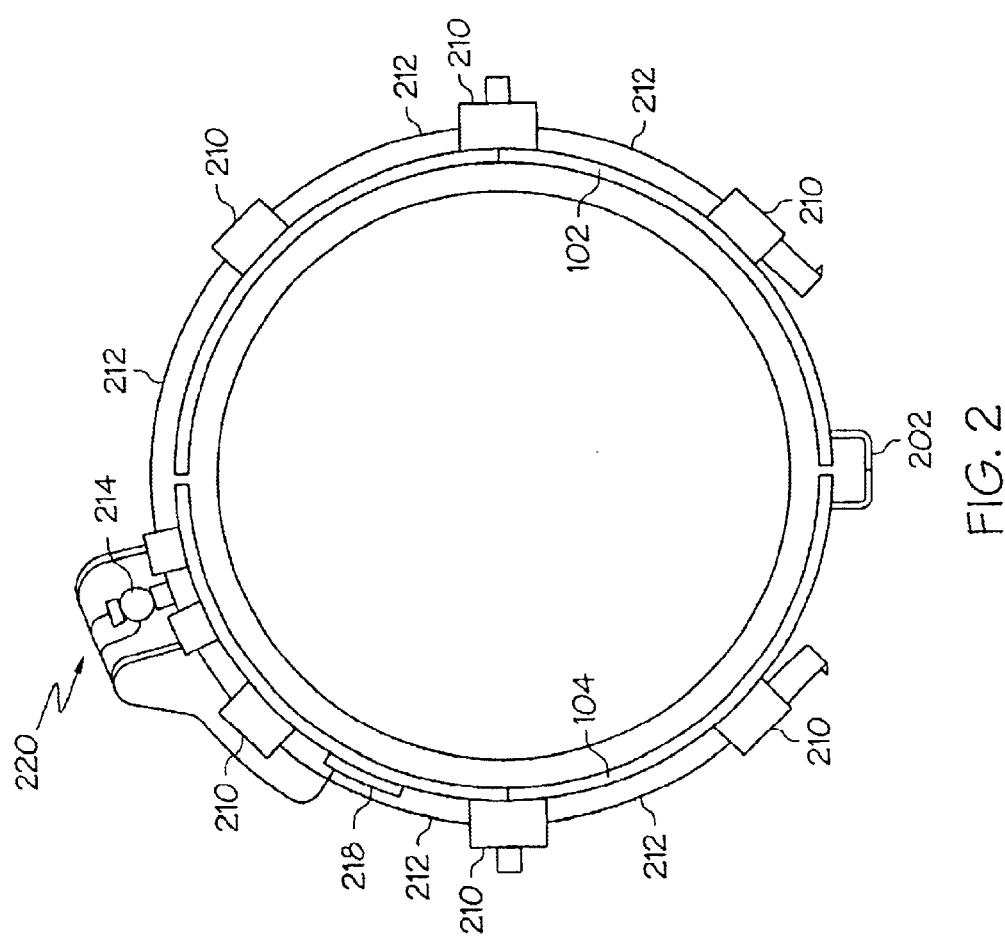
FIG. 2 is a simplified end view of a thrust reverser actuation system according to an exemplary embodiment of the present invention.

As shown more clearly in FIG. 2, the thrust reverser system 200 includes a plurality of actuators 210 that are individually coupled to the transcowls 102 and 104. In the depicted embodiment, half of the actuators 210 are coupled to one of the transcowls 102, and the other half are coupled to another transcowl 104. One or more of the actuators 210 may include a lock, which is described in detail further below, some or all of which may include a position sensor. In addition, each of the transcowls 102 and 104 may also have a lock. It is noted that the number and arrangement of the actuators 210 is not limited to what is depicted in FIG. 2, but could include other numbers of actuators 210 as well. The number and arrangement of actuators and locks is selected to meet the specific design requirements of the system and can be varied.

The actuators 210 are interconnected via a plurality of drive mechanisms 212, each of which, in the particular depicted embodiment, is a flexible shaft. The flexible shafts 212 in this configuration are driven to ensure that the actuators 210 and the transcowls 102 and 104 move in a substantially synchronized manner. For example, when one transcowl 102 is moved, the other transcowl 104 is moved a like distance at substantially the same time. Other synchronization mechanisms may be used including, but not limited to, electrical synchronization or open loop synchronization, or any other mechanism or design that transfers power between the actuators 210.

A power drive unit (PDU) assembly 220 is coupled to the actuators 210 via one or more flexible shafts 212. In the depicted embodiment, the PDU assembly 220 includes a dual output motor 214 that is coupled to two of the flexible shafts 212. The motor 214 may be any one of numerous types of motors such as, for example, an electric (including any one of the various DC or AC motor designs known in the art), a hydraulic, or a pneumatic motor. Though not explicitly depicted, it should be understood that the PDU assembly 220 may include a lock mechanism. It should additionally be understood that the system could be configured with two or more PDU assemblies 220, one per transcowl 102 and 104, rather than a single PDU assembly 220. In any case, with the depicted arrangement, the rotation of the PDU assembly 220 results in the synchronous operation of the actuators 210, via the flexible shafts 212, thereby causing the transcowls 102 and 104 to move at substantially the same rate.

The PDU assembly 220 is controlled by a control circuit 218. The control circuit 218 receives commands from a non-illustrated engine control system such as, for example, a FADEC (full authority digital engine control) system, and provides appropriate activation signals to the PDU assembly 220 in response to the received commands. In turn, the PDU assembly 220 supplies a drive force to the actuators 210 via the flexible shafts 212. As a result, the actuators 210 cause the transcowls 102 and 104 to translate between the stowed and deployed positions.

Figure 3:
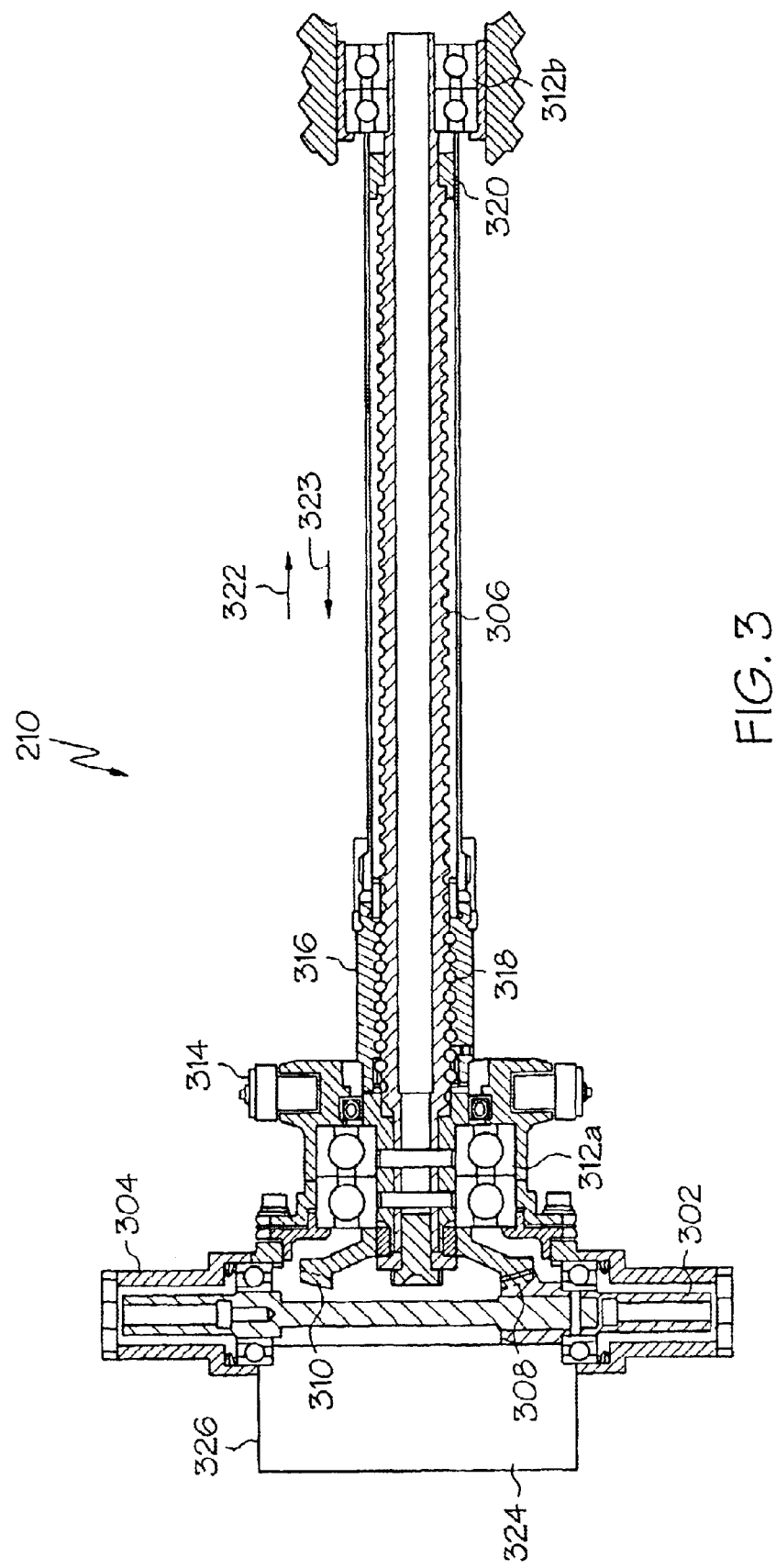
FIG. 3 is a cross section view of an actuator assembly that may be used in the thrust reverser actuation system of FIG. 2.

The actuators 210 used in the thrust reverser system 200 may be any one of numerous actuator designs presently known in the art or hereafter designed. However, in the depicted embodiment the actuators 210 are ballscrew type actuators. An exemplary embodiment of this type of actuator 210 is shown in FIG. 3 and, for completeness of understanding, will now be discussed. In the depicted embodiment, the actuator 210 includes a drive shaft 302, which is mounted in an actuator housing 304, and a ball screw shaft 306 that extends through the actuator housing 304. The drive shaft 302 is adapted to couple to one of the flexible shafts 212 (not shown in FIG. 3), and includes a first bevel gear 308 that mates with a second bevel gear 310. The second bevel gear 310 is coupled to the ball screw shaft 306, which is rotationally supported by a first duplex bearing assembly 312a. One end of the ball screw shaft 306 is connected, via a gimbal mount 314, to the forward end of the engine nacelle support (not illustrated). Another end of the ball screw shaft 306 is rotationally supported by a second duplex bearing assembly 312b, which is connected to the aft end of an engine nacelle support (not illustrated). A ball nut 316, which is rotationally supported on the ball screw shaft 306 by a plurality of ball bearings 318, is attached to one of the transcowls 102 or 104 (not illustrated in FIG. 3). Thus, rotation of the ball screw shaft 306 results in translation of the ball nut 316 and transcowl 102 or 104. A mechanical hard stop 320, positioned near the second duplex bearing assembly 312b, stops translation of the ball nut 316, and thus the attached transcowl 102 or 104, when it is moved in the deploy direction 322.

As was previously noted, one or more of the actuators 210 may include a lock assembly to prohibit unintended movement of the actuator 210 in the deploy direction, and thus unintended thrust reverser deployment. In the embodiment shown in FIG. 3, a lock assembly 324, which is mounted within a lock assembly housing 326, is coupled to the actuator housing 304. A more detailed illustration of an exemplary embodiment of the lock assembly 324 is shown in FIGS. 4–13, and will now be described in detail.

Figure 4:
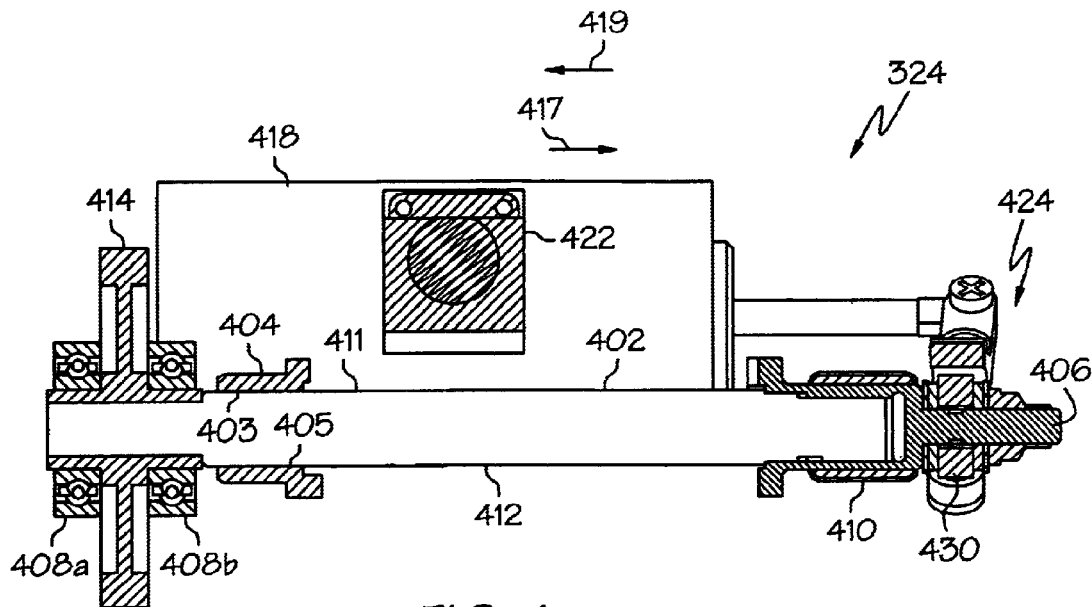
FIG. 4 is a cross section view of a lock assembly according to an exemplary embodiment of the present invention that may be used in the thrust reverser actuation system of FIG. 2.
Figure 5:
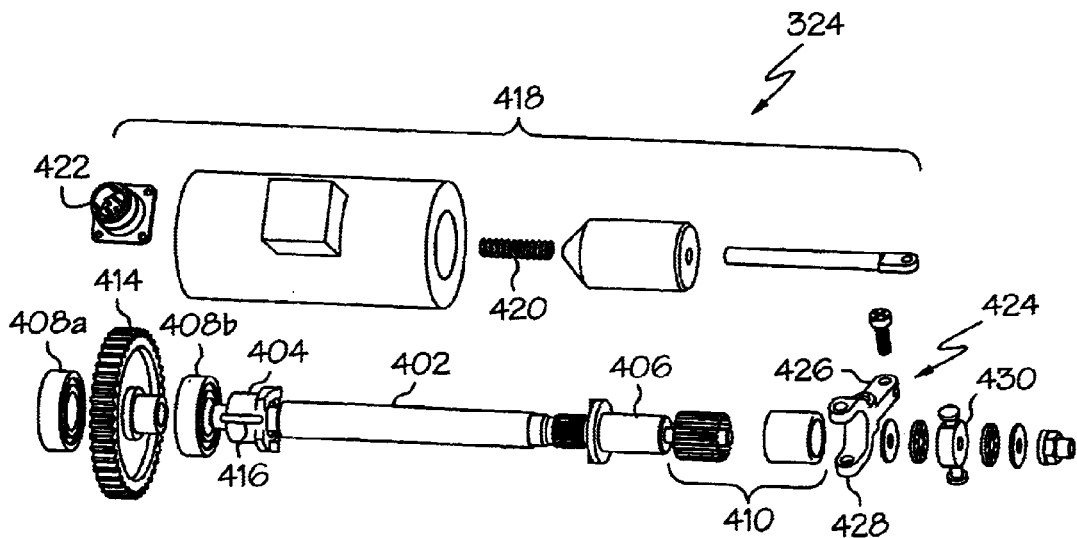
FIG. 5 is a perspective exploded view of the lock assembly of FIG. 4.
Figure 6:
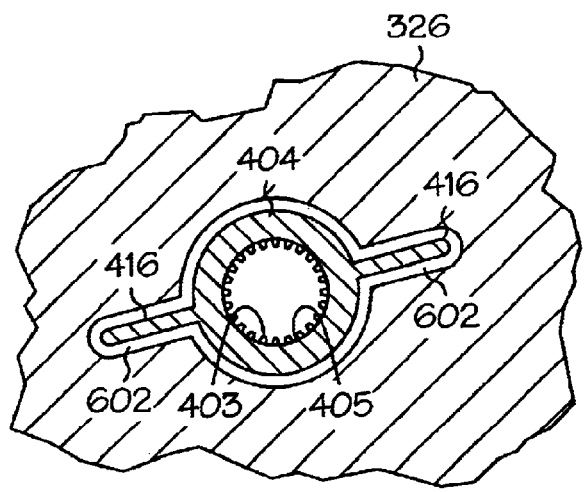
FIG. 6 is a partial cross sectional view of a section of the lock assembly and housing of FIG. 4.

With reference first to FIGS. 4 and 5, it is seen that the lock assembly 324 includes a lock shaft 402, a lock nut 404, and a stop collar 406. The lock shaft 402 has threads 411 formed along at least a portion of its outer surface 412, and is rotationally mounted in the housing 326 (not shown in FIGS. 4 and 5) via at least a first bearing set 408a,b and a second bearing 410. The second bearing 410 surrounds a portion of the stop collar 406. A first spur gear 414 is mounted on one end of the lock shaft 402, and is configured to mate with a second spur gear (not shown) mounted on the actuator drive shaft 302. Thus, when the actuator drive shaft 302 is rotated, the lock shaft 402 also rotates. In the depicted embodiment, the spur gears are sized to provide a rotational reduction between the actuator drive shaft 302 and the lock shaft 402. This rotational reduction reduces the length and the rotational speed of the lock shaft 402 relative to the actuator drive shaft 302, and ensures that the lock nut 404 will translate between its deploy and stow positions in synchronism with the translation of the actuator ball nut 312 between its deploy and stow positions. It will be appreciated that the spur gears may be sized to provide any one of numerous amounts of rotational reduction that may be needed to provide the desired function. In the depicted embodiment, a 3:1 reduction is provided.

The lock nut 404 is mounted on the lock shaft 402 and has threads 403 formed on at least a portion of its inner surface 405. These threads 403 mate with the threads 411 formed on the lock shaft outer surface 412. In the depicted embodiment, the lock nut 404 is mounted so that it does not rotate when the lock shaft 402 rotates. This is done by providing one or more flanges 416 that extend from the lock nut 404. As shown more clearly in FIG. 6, these flanges 416 ride in channels 602 formed in the lock assembly housing 326. The channels 602 prohibit rotation of the lock nut 404 when the lock shaft 402 is rotated, and preferably extend at least along the length of the lock shaft 402. Thus, when the lock shaft 402 rotates, the lock nut 404 does not rotate. Rather, because of the engaged threads on the lock shaft 402 and lock nut 404, the lock nut 404 translates along the lock shaft 402 between its deploy and stow positions. It will be appreciated that the particular configuration described and depicted herein for mounting the lock nut 404 is merely exemplary of numerous configurations that may be used to provide this same function.

The stop collar 406 is also mounted on the lock shaft 402, but in a different manner than the lock nut 404. In particular, the stop collar 406 is mounted on the lock shaft 402 such that it is rotated with the lock 402, but is also able to translate along at least a section of the lock shaft 402. Thus, the stop collar 406 can be translated between a locked position and an unlocked position. To accomplish this, a section of the lock shaft 402, on or near one of its ends, is splined, as is at least a portion of the inner surface of the stop collar 406.

The lock assembly 324 also includes an actuation device that is used to move the stop collar 406 between the locked and unlocked positions. In the depicted embodiment, the actuation device is a spring-biased solenoid assembly 418, which is coupled to the stop collar 406 via a yoke assembly 424. The solenoid assembly 418 includes an electrical input plug 422 that is adapted to receive electrical power to operate the solenoid assembly 418. The solenoid assembly 418 is configured such that a spring 420 biases the solenoid assembly 418 in a lock direction 417 and, when energized, moves in an unlock direction 419. Thus, the solenoid assembly 418 defaults to the lock direction 417 if electrical power to the solenoid assembly 418 is unavailable or is lost. It will be appreciated that the actuation device is not limited to a solenoid-operated device, but could also be a implemented, for example, as a hydraulically-operated device or a pneumatically-operated device.

The yoke assembly 424, which couples the solenoid assembly 418 to the stop collar 406, includes a yoke arm 426 and a yoke collar 428. The yoke arm 426 is coupled to the solenoid assembly 418 by, for example, a threaded fastener, and is pivotally coupled to the yoke collar 428 by, for example, a pivot pin. The yoke collar 428 is coupled to the stop collar 406 via a thrust bearing assembly 430. Thus, when the stop collar 406 rotates, a torque is not transmitted to the yoke assembly 424.

Figure 7:
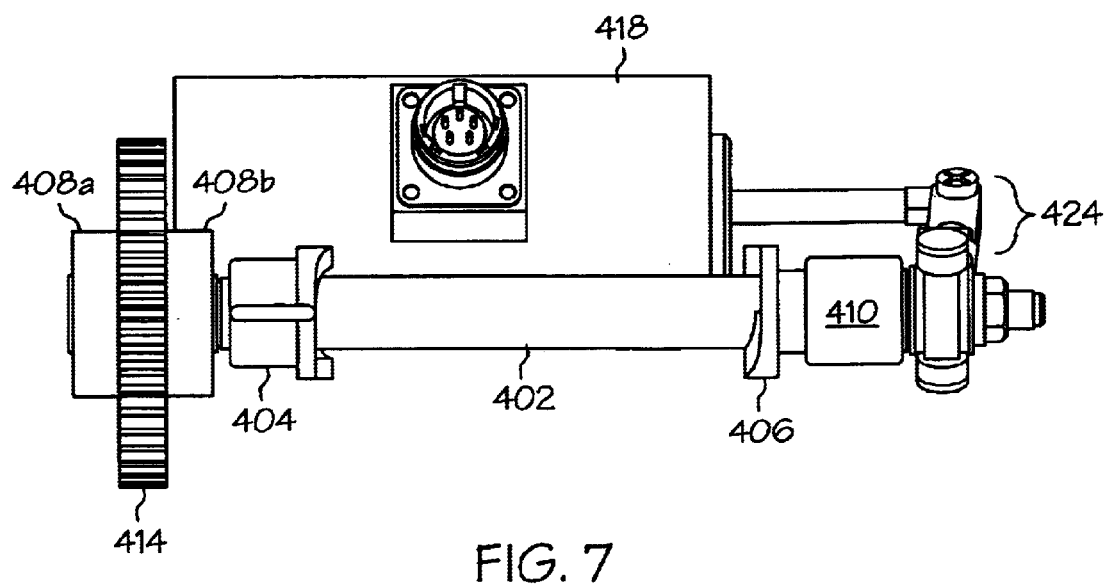
FIG. 7 is a front view of the lock assembly of FIG. 4 in its deployed position.
Figure 8:
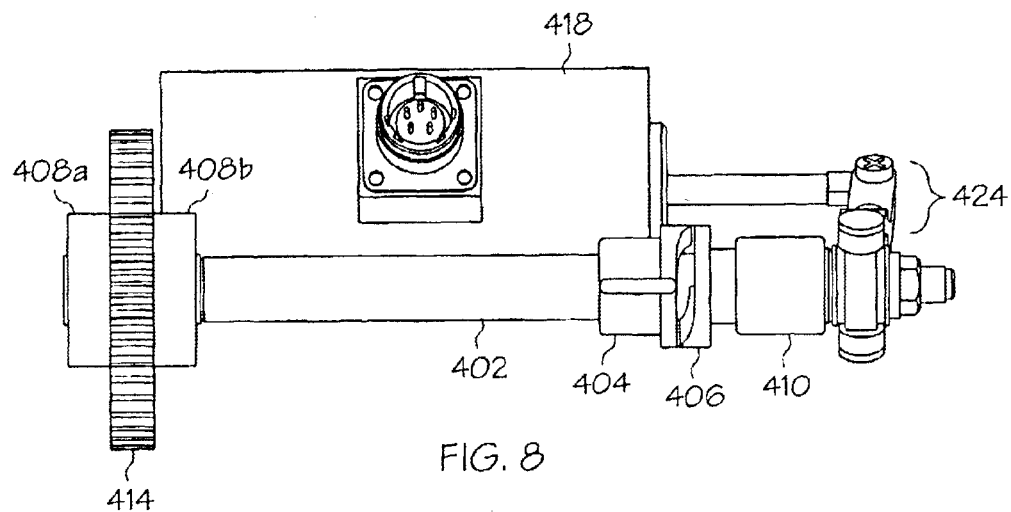
FIGS. 8, 9, and 10 are a front view, a close-up front view of an end, and a close-up top view of an end, respectively, of the lock assembly of FIG. 4 in a locked and stowed configuration.
Figure 9:
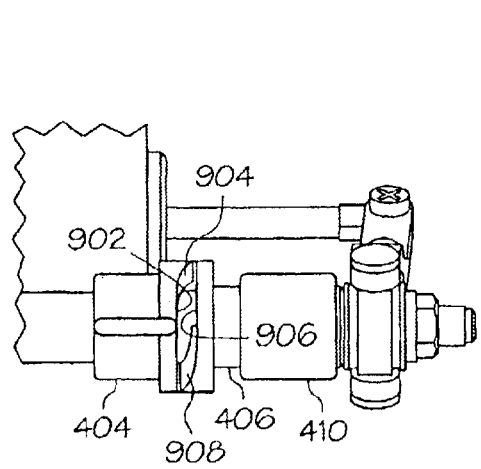
Figure 10:
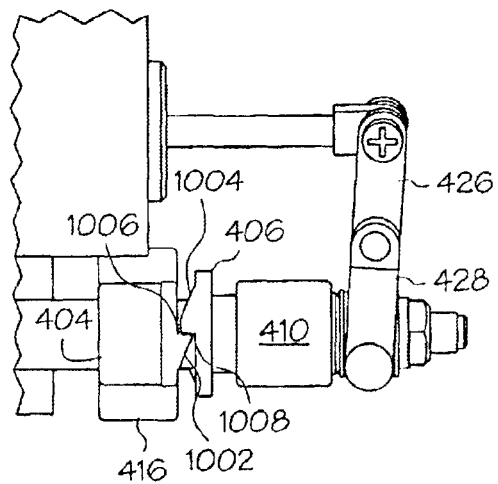

As was noted above, the lock nut 404 is moveable between a deployed position and a stowed position, and the stop collar 406 is moveable between a locked position and an unlocked position. When the stop collar 406 is in its locked position, rotation of the lock shaft 402 may be prohibited, depending upon the position of the lock nut 404. Specifically, as shown in FIG. 7, when the stop collar 406 is in the locked position, and the lock not is not at or near its stowed position, the lock shaft 402 can be rotated in either the deploy or stow directions. However, as shown in FIGS. 8–10, when the lock nut 404 is at or near its stowed position, rotation of the lock shaft 402 in the deploy direction is prohibited, while its rotation in the stow direction is not. This is because the lock nut 404 and stop collar 406 are structurally configured to provide this functionality.

In particular, as shown most clearly in FIGS. 9 and 10, the lock nut 404 has a stop collar engagement surface 902 that includes one or more engagement teeth 904, and the stop collar 406 has a lock nut engagement surface 906 that includes one or more engagement teeth 908. The engagement teeth 904 and 908 on the lock nut 404 and stop collar 406, respectively, are similarly configured. In particular, the engagement teeth 904 and 908 each include, respectively, a ramped surface 1002 and 1004, and a substantially perpendicular surface 1006 and 1008 (see FIG. 10). The ramped surfaces 1002 and 1004 gradually extend from the stop collar engagement surface 1002 and lock nut engagement surface 1006, respectively, toward the respective substantially perpendicular surfaces 1006 and 1008. Thus, as shown most clearly in FIG. 9, when the stop collar 406 is in the locked position and the lock nut 404 is in or near the stowed position, and the lock shaft 402 is rotated in the stow direction, then ramped surfaces 1002 and 1004 on the lock nut 404 and stop collar 406, respectively, will ratchet without engagement. However, as FIG. 10 also clearly shows, if an attempt is instead made to rotate the lock shaft 402 in the deploy direction, then the perpendicular surfaces 1006 and 1008 one the engagement teeth 904 and 908, respectively, engage and prohibit lock shaft rotation.

Turning now to FIGS. 11-13, it is seen that when the lock assembly 324 is commanded to unlock, by energizing the solenoid assembly 418, the stop collar 406 is moved to its unlocked position, disengaging it from the lock nut 402. As a result, the lock shaft 402 may be rotated in either the deploy or stow directions.

An operational cycle of the thrust reverser system 200 from the stowed position to the deployed position and then back to the stowed position, in which one or more of the actuator assemblies 210 includes the lock assembly 324, will now be provided. In doing so, reference should be made to FIGS. 2-13 in combination.

To move the thrust reversers to the deployed position, the pilot will issue an appropriate command, via an appropriate user-machine-interface in the cockpit. In response, the controller 218 will issue an unlock command to each of the lock assemblies 324, which energizes the each lock assembly's solenoid assembly 418 and moves the stop collar 406 on each lock assembly 324 to its unlocked position (see FIGS. 11-13). When the stop collars 406 are moved to the unlocked position, each disengages from its associated lock nut 404.

At substantially the same time that the unlock command is issued, the controller 218 also energizes the motor 214 to drive the thrust actuators 210 in their deploy direction 322 (see FIG. 3). As the actuators 210 are driven in their deploy direction, each actuator 210 that has a lock assembly 324 simultaneously drives the associated lock shaft 402 in its deploy direction, which translates the associated lock nut 404 toward its deploy position. It is noted that shortly after the lock nut 404 begins translating in its deploy direction, the controller 218 may issue a lock command to the lock assemblies 324 (e.g., de-energizing the solenoid assembly 418), since lock nut 404 and stop collar 406 will not engage and prevent actuator 210 movement (see FIG. 7). In any case, the motor 214 will continue to drive the actuators 210 until the thrust reversers are fully deployed.

When the thrust reversers are no longer needed, the pilot will issue the appropriate command. In response, the controller 218 will energize the motor 214 to drive the actuators 210 in their stow direction 323 (see FIG. 3), and the lock assemblies 324 will remain in their locked positions. As the actuators 210 are driven in their stow direction, each actuator 210 that has a lock assembly 324 simultaneously drives the associated lock shaft 402 in its stow direction, which translates the associated lock nut 404 toward its stow position. As the lock nut 404 approaches its stow position, the ramped surfaces 1002 and 1004 on the lock nut 404 and stop collar 406, respectively, will contact one another and ratchet, until the thrust reversers are fully stowed and the controller 21 ceases rotation of the motor 214. As FIGS. 8-10 show, when the lock nut 404 is at or near its stow position and the lock assembly 324 is in the locked position, rotation of the lock shaft 402, and thus the actuator 210, in the deploy direction is prevented, while rotation in the stow direction is not.

The lock assembly 324 was depicted and described as being mounted to the actuator housing 304 and coupled, via the spur gears, to the actuator drive shaft 302. However, it will be appreciated that the lock assembly 324 could also be mounted in numerous other places in a thrust reverser actuation system. For example, the lock assembly 324 could be operably coupled to one of the drive mechanisms 212, or between two drive mechanisms 212. In addition, the lock assembly 324 is not limited to being operably coupled to the actuator drive shaft 302. Indeed, by way of non-limiting example, the lock assembly 324 could be operably coupled to the actuator ball screw shaft 306.

The lock assembly 324 disclosed herein prevents thrust reverser deployment when the thrust reversers are in the stowed position. However, the lock does not prevent thrust reverser movement even if the lock assembly 324 is in the lock position and the thrust reversers are out of the stowed position. Thus, when the thrust reversers are not in the stowed position, the thrust reversers can move in either the deploy or stow directions regardless of the lock assembly position.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. An aircraft trust reverser control system, comprising:
    a power drive unit operable to supply a drive force;
    a drive mechanism coupled to receive the drive force;
    an actuator assembly coupled to the drive mechanism and operable to move, upon receipt of the drive force, between a stowed position and a deployed position; and
    a lock assembly coupled to the drive mechanism, the lock assembly including:
        a rotationally mounted lock shaft having threads on at least a portion of its outer surface and rotational in a deploy direction and a stow direction,
        a stop collar mounted on the lock shaft and translationally moveable along at least a section thereof, the sop collar having at least a lock nut engagement so and a lock nut mounted on the lock shaft and configured, in response to rotation of the lock shaft alone, to translate along at least a portion thereof, the lock nut having at least (i) a sop collar engagement surface configured to engage the lock nut engagement surface on the stop collar and (ii) threads on at least a portion of its inner surface that mate with the threads on the lock shaft outer surface, whereby the rotation of the lock shaft alone in the deploy diction and the stow direction translation of the lock nut, respectively, between a deploy position and a stow position.

2. The system of claim 1, further comprising:
a first spur gear mounted on the lock shaft to rotate therewith, the first spur gear adapted to engage at least one second spur gear.

3. The system of claim 1, further comprising:
a release mechanism coupled to the stop collar and operable to slide the stop collar on the lock shaft between at least a locked position and an unlocked position.

4. The system of claim 3, wherein the release mechanism comprises:
a yoke arm coupled to the stop collar; and
a solenoid coupled to the yoke arm and operable to move been a first position and a second position, whereby the stop collar is moved, reactively, the locked position and the unlocked position.

5. The system of claim 4, further comprising:
a spring configured to bias the solenoid toward the first position.

6. The system of claim 1, wherein:
the stop collar engagement surface will not contact the lock nut engagement surface when the stop collar is in the unlocked position and the lock nut is in the stowed position; and
the stop collar engagement surface will contact lock nut engagement surface when the stop collar is it the locked position and the lock nut is within a predetermined dista of the stowed position.

7. The system of claim 6, wherein the stop collar engagement surface and the lock nut engagement surface each comprise:
two or more engagement teeth protruding from the engagement surface, each of the engagement teeth including:
a first surface having a top end and a bottom end, the first surface extending, from its bottom end, in a substantially perpendicular manner from the engagement surface, to its top end, and
a ramped surface having a first end joined to the first surface top and a second end joined to the engagement surface, the ramped surface sloping substantially downwardly from its first end to its second end.

8. A thrust reverser system lock assembly, comprising:
a rotationally mounted lock shaft having threads on at least a portion of its outer surface and rotational in a deploy direction and a stow direction;
a stop collar mounted on the lock shaft and translationally moveable along at least a section thereof, the stop collar having at least a lock nut engagement surface; and
a lock nut mounted on the lock shaft and configured, in response to rotation of the lock shaft alone, to translate along at least a portion thereof, the lock nut having at least (i) a stop collar engagement surface configured to engage the lock nut engagement surface on the stop collar and (ii) threads on at least a portion of its inner surface that mate with the treads on the lock shaft outer surface, whereby the rotation of the lock shaft alone in the deploy direction and the stow direction causes translation of the lock nut, respectively, between a deploy position and a stow position.

9. The lock assembly of claim 8, further comprising:
a first spur gear mounted on the lock shaft to rotate therewith the first spur gear adapted to engage at least one second spur gear.

10. The lock assembly of claim 8, further comprising:
a release mechanism coupled to the stop collar and operable to slide the stop collar on the lock shaft between at least a locked position and an unlocked position.

11. The lock assembly of claim 10, wherein the release mechanism comprises:
a yoke am coupled to the stop collar; and
a solenoid coupled to the yoke arm and operable to move between a first position and a second position, whereby the sp collar is moved, respectively, between the locked position and the unlocked position.

12. Th lock assembly of claim 11, further comprising:
a spring configured to bias the solenoid toward the first position.

13. The lock assembly of claim 8, wherein:
the stop collar engagement surface will not contact the lock nut engagement surface when the stop collar is in the unlocked position and the lock nut is in the stowed position; and
the stop collar engagement surface will contact lock nut engagement surface when the stop collar is in the locked position and the lock nut is within a predetermined distance of the stowed position.

14. The lock assembly of claim 13, wherein the stop collar engagement surface and the lock nut engagement surface each comprise:
two or more engagement teeth protruding from the engagement surface, each of the engagement teeth including:
a first surface having a top end and a bottom end, the first surface extending, from its bottom end, in a substantially perpendicular manner from the engagement surface, to its top end, and
a ramped sac having a first end joined to the first surface top and a second end joined to the engagement surface, the ramped surface sloping substantially downward from its first end to its second end.

15. A trust reverser actuator assembly, comprising:
a housing;
a dive shaft rotationally mounted in the housing to rotate in a deploy direction and a stow direction; and
a lock assembly coupled to the housing, the lock assembly including:
a rotationally mounted lock shaft having threads on at least a portion of its outer spice, the lock shaft coupled to the drive shaft and rotational therewith in the deploy and stow directions,
a stop collar mounted on the lock shaft and translationally moveable along at least a section thereof, the stop collar having at last a lock nut engagement surface, and
a lock nut mounted on the lock shaft and configured, in response to rotation of the lock shaft alone, to translate along at least a portion thereof, the lock nut having at least (i) a stop collar engagement surface configured to engage the lock nut engagement surface on the stop collar and (ii) threads on at least a portion of its inner spice that mate with the threads on the lock shaft outer surface, whereby rotation of the lock shaft alone in the deploy and a stow directions causes translation of the lock nut between a deploy and a stow position, respectively.

16. The actuator assembly of claim 15, further comprising:
a first spur gear mounted on the lock shaft to rotate therewith, the first spur gear adapted to engage at least one second spur gear.

17. The actuator assembly of claim 15, further comprising:
a release mechanism coupled to the stop collar and operable to slide the stop collar on the lock shaft between at least a locked position and an unlocked position.

18. The actuator assembly of claim 17, wherein the release mechanism comprises:
a yoke arm coupled to the stop collar; and
a solenoid coupled to the yoke arm and operable to move been a first position and a second position, whereby the stop collar is moved, respectively, between the locked position and the unlocked position.

19. The actuator assembly of claim 18, further coming a spring configured to bias the solenoid toward the first position.

20. The actuator assembly of claim 15, wherein:
the stop collar engagement surface will not contact the lock nut engagement surface when the stop collar is in the unlocked position and the lock out is in the stowed position; and
the stop collar engagement surface will contact lock nut engagement surface when the stop collar is in the locked position and the lock nut is within a predetermined distance of the stowed position.

21. The actuator assembly of claim 20, wherein the stop collar engagement surface and the lock nut engagement surface each comprise:
two or more engagement teeth protruding from the engagement surface, each of the engagement teeth including:
a first surface having a top end and a bottom end, the first surface extending, from its bottom end, in a substantially perpendicular manner from the engagement surface, to its top end, and
a ramped surface having a first end joined to the first surface top and a second end joined to the engagement surface, the ramped surface sloping substantially downwardly from its first end to its second end.

* * * * *

UNITED STATES PATENT AND TRADEMARK OFFICE
CERTIFICATE OF CORRECTION

PATENT NO. : 6,935,097 B2
APPLICATION NO. : 10/418643
DATED : August 30, 2005
INVENTOR(S) : David M. Eschborn It is certified that error appears in the above-identified patent and that said Letters Patent is hereby corrected as shown below:

In Column 8, line 54, delete "trust" and add --thrust--
In Column 8, line 66, delete "sop" and add --stop--
In Column 8, line 67, delete "so" and add --surface,--
In Column 9, line 4, delete "sop" and add --stop--
In Column 9, line 9, delete "diction" and add --direction--
In Column 9, line 10, add --causes-- after "direction"
In Column 9, line 28, delete "reactively" and add --respectively, between--
In Column 9, line 42, delete "dista" and add --distance--
In Column 10, line 3, delete "treads" and add --threads--
In Column 10, line 10, add --,-- after "therewith"
In Column 10, line 19, delete "am" and add --arm--
In Column 10, line 23, delete "sp" and add --stop--
In Column 10, line 25, delete "Th" and add --The--
In Column 10, line 52, delete "trust" and add --thrust--
In Column 10, line 59, delete "spice" and add --surface--
In Column 10, line 64, delete "last" and add --least--
In Column 11, line 5, delete "spice" and add --surface--
In Column 11, line 26, delete "been" and add --between--
In Column 12, line 1, delete "coming" and add --comprising--
In Column 12, line 7, delete "out" and add --nut--

Signed and Sealed this

Second Day of October, 2007

JON W. DUDAS
*Director of the United States Patent and Trademark Office*